United States Patent
Deniau et al.

(10) Patent No.: US 7,734,391 B2
(45) Date of Patent: Jun. 8, 2010

(54) HYSTERESIS OF SWITCHING FROM PARK TO DRIVE BASED ON VEHICLE SPEED

(75) Inventors: Jean-Christophe Deniau, Fenton, MI (US); Brian Farrell, Troy, MI (US); Sanjaya Kumar Dash, Macomb, MI (US); Tejas B. Desai, Sterling Heights, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1785 days.

(21) Appl. No.: 10/848,713

(22) Filed: May 19, 2004

(65) Prior Publication Data

US 2004/0236485 A1      Nov. 25, 2004

Related U.S. Application Data

(60) Provisional application No. 60/472,284, filed on May 21, 2003, provisional application No. 60/472,307, filed on May 21, 2003.

(51) Int. Cl.
    *H04B 1/06*     (2006.01)
(52) U.S. Cl. .......................................... 701/36; 342/82
(58) Field of Classification Search ............ 340/426.13, 340/426.15–426.17, 447, 456, 442, 441; 342/82, 89, 128; 307/10.1–10.3, 10.6; 701/36
    See application file for complete search history.

(56) References Cited

U.S. PATENT DOCUMENTS

| | | | | |
|---|---|---|---|---|
| 5,463,374 A | * | 10/1995 | Mendez et al. | 340/442 |
| 5,661,651 A | * | 8/1997 | Geschke et al. | 701/88 |
| 5,963,128 A | * | 10/1999 | McClelland | 340/447 |
| 6,043,738 A | * | 3/2000 | Stewart et al. | 340/447 |
| 6,075,460 A | * | 6/2000 | Minissale et al. | 340/825.69 |
| 6,420,967 B1 | * | 7/2002 | Ghabra et al. | 340/447 |
| 6,650,236 B2 | * | 11/2003 | Ghabra et al. | 340/447 |
| 7,305,225 B2 | * | 12/2007 | Benz et al. | 455/345 |

* cited by examiner

*Primary Examiner*—Dalena Tran

(57) ABSTRACT

A communication for a vehicle (10) has a first transmitter (34) for transmitting a first signal relating to a first vehicle system (22) and a second transmitter (42) for transmitting a second signal relating to a second vehicle system (38). (FIG. 1) A single receiver (46) has a first reception mode (50) and a second reception mode (54). The first reception mode (50) is receptive to the first signal while the second reception mode (54) is receptive to the second signal. A control unit (58) switches the receiver (46) between the first reception mode (50) and the second reception mode (54).

12 Claims, 4 Drawing Sheets

| Key in Ignition | PRNDL Position | Vehicle Speed | Receiver Mode | Feasibility |
|---|---|---|---|---|
| Don't Care | P | < 5mph | ASK | Yes |
| Yes | > P | Don't Care | FSK | Yes |
| | | | | |
| No | > P | Don't Care | Default ASK | No Due to key interlock |
| No | P | > 5mph | Default FSK | No Due to FMVSS Park regulation |

| Key in Ignition | PRNDL Position | Vehicle Speed | Receiver Mode | Feasibility |
|---|---|---|---|---|
| Don't Care | P | <5mph | ASK | Yes |
| Yes | >P | Don't Care | FSK | Yes |
| No | >P | Don't Care | Default ASK | No Due to key interlock |
| No | P | >5mph | Default FSK | No Due to FMVSS Park regulation |

HYSTERESIS OF SWITCHING FROM PARK TO DRIVE BASED ON VEHICLE SPEED

This application claims priority to U.S. Provisional Patent Application No. 60/472,284 filed on May 21, 2003 and to U.S. Provisional Patent Application No. 60/472,307 filed on May 21, 2003.

BACKGROUND OF THE INVENTION

This invention relates to a communication system for a vehicle.

Vehicles typically have a remote keyless entry system that permits the locking and unlocking of doors as well as the opening and closing of windows. This system has a transmitter located in a key fob or made part of a key that transmits a radio frequency signal to a receiver within the vehicle. Based on signals from the transmitter and received by the receiver, a control unit controls the functioning of the various ports of the vehicle.

Increasingly, manufacturers are installing tire pressure monitoring systems in vehicles. A tire pressure monitoring system provides a vehicle operator with information concerning the tire pressure of the wheels of the vehicle. One common system uses transmitters located at each wheel to transmit information relating to each tire to a receiver on the vehicle. Like remote keyless entry systems, the signal is also transmitted at a radio frequency. However, in contrast to the signal transmitted by the remote keyless entry system, the tire pressure monitoring system transmits its signal on a frequency modulated or FSK band. The signal of the remote keyless entry system (RKE) is transmitted on an amplitude modulated or ASK band.

Due to the differing transmission bands used by each of the systems, a vehicle has two different receivers: one receiver for receiving an amplitude modulated signal and another receiver for receiving a frequency modulated signal. Having a receiver for each system is expensive.

A need therefore exists for a communication system for a vehicle that eliminates the additional receiver.

SUMMARY OF THE INVENTION

The invention comprises a communication system for a vehicle. The vehicle system has first a transmitter for transmitting a signal relating to a first vehicle system and a second transmitter for transmitting a signal relating to a second vehicle system. The first vehicle system may be a remote keyless entry system while the second vehicle system may be a tire pressure monitoring system. In contrast to existing systems, a single receiver is used for both the first vehicle system and the second vehicle system. The receiver has two reception modes: one mode receptive to signals from the first vehicle system and a second mode receptive to signals from the second vehicle system. A control unit is used to switch the receiver between the first reception mode and the second reception mode.

The first signal may be an amplitude modulated signal while the second signal may be a frequency modulated signal. The control unit is programmed to control the selection between the first reception mode and the second reception mode and may switch between these modes based upon a sensed condition relating to the vehicle. Programming in the control unit may further switch between the first mode and the second mode when the sensed condition reaches a particular value. However, to prevent frequent switching back and forth between modes, the control unit may be programmed to switch from the first mode to the second mode at one value and to switch back to the first mode at a different value than the first value. Additionally, the control unit may be programmed to detect different conditions and place the receiver in the first reception mode when one condition is detected and then place the receiver in the second reception mode when a second condition exists. The control unit may be programmed to delay a switch between the first reception mode and the second reception mode. The control unit may also be programmed to stay in a particular mode following a switch between modes for a particular time period.

The invention further encompasses a method of receiving a vehicle signal. A receiver is provided on a vehicle. The receiver has a first reception mode and a second reception mode. The first reception mode receives signals from a remote vehicle port actuation system while the second reception mode is receptive to signals from a tire pressure monitoring signal. The first signal is of a different band than the second signal. The first reception mode is selected when a particular condition exists. The second reception mode is selected when another condition exists. The first condition is different from the second condition.

The condition may relate to a vehicle speed, a presence of a key in an ignition, and a status of a vehicle transmission. For example, if the vehicle is detected to be moving based on these conditions, the receiver is switched to the second reception mode because it is presumed that the driver is likely to need access to information from the tire pressure monitoring system. If the vehicle is not moving and parked, it is presumed that the driver will need to control the remote vehicle port actuation system. Accordingly, the receiver is placed in the first reception mode. In this way, the invention automatically switches between reception modes to tune to the signal, whether ASK or FSK, most likely needed to meet the driver's needs.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
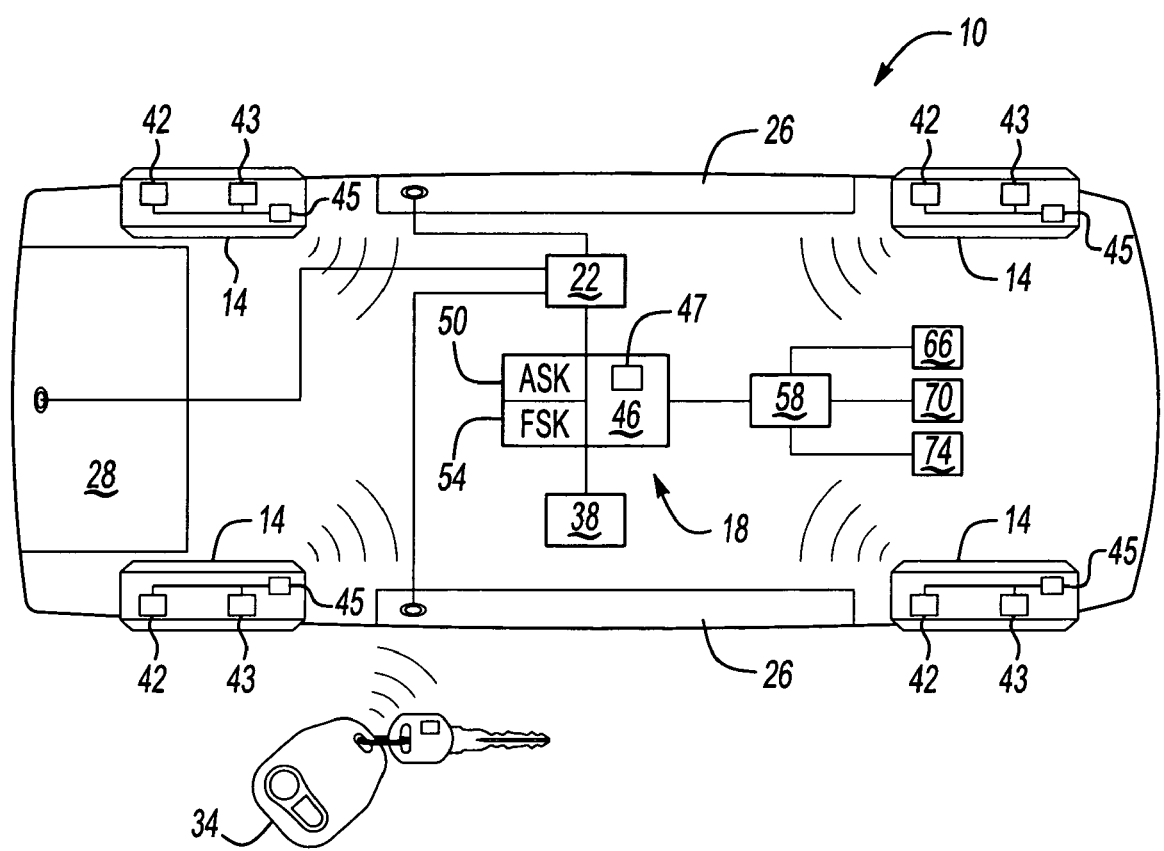
FIG. 1 illustrates an overhead view of a vehicle having the inventive communication system with a single receiver having two reception modes.

FIG. 1 illustrates vehicle 10 with inventive communication system 18. Communication system 18 controls communication for two vehicle systems: here, remote port actuation system 22 and tire pressure monitoring system 38. Like conventional remote port actuation systems, remote port actuation system 22 controls locking and unlocking of doors 26 and trunk 28 and may further control operation of windows and a sunroof. Control of these features is through first transmitter 34, which may be found on a key fob or be part of a key. As known, remote port actuation system 22 operates on an amplitude modulation band, also known as an ASK mode.

Also on vehicle 10 is tire pressure monitoring system 38. Tire pressure monitoring system 38 monitors the pressure of vehicle wheels 14 as known. On each wheel 14 is second transmitter 42, which broadcasts a frequency modulated signal conveying information about wheels 14. This band is also known as an FSK mode. In contrast to other communication systems, the inventive communication system 18 has receiver 46 with two receiving modes. First reception mode 50 is tuned to receive ASK signals and is therefore receptive to signals from remote port actuation system 22 while second reception mode 54 is receptive to FSK signals that are broadcast by second transmitter 42 of tire pressure monitoring system 38. Control unit 58 switches receiver 46 between first reception mode 50 and second reception mode 54. In this way, only one receiver, receiver 46, is required for two different communication systems, thereby reducing the overall cost of the communication system. Indeed, communication system 18 may not be limited to use with just a remote port actuation system and a tire pressure monitoring system. Communication system 18 may be used to control communication received by receiver 46 for any vehicle system as well as any number of systems.

Figure 2:
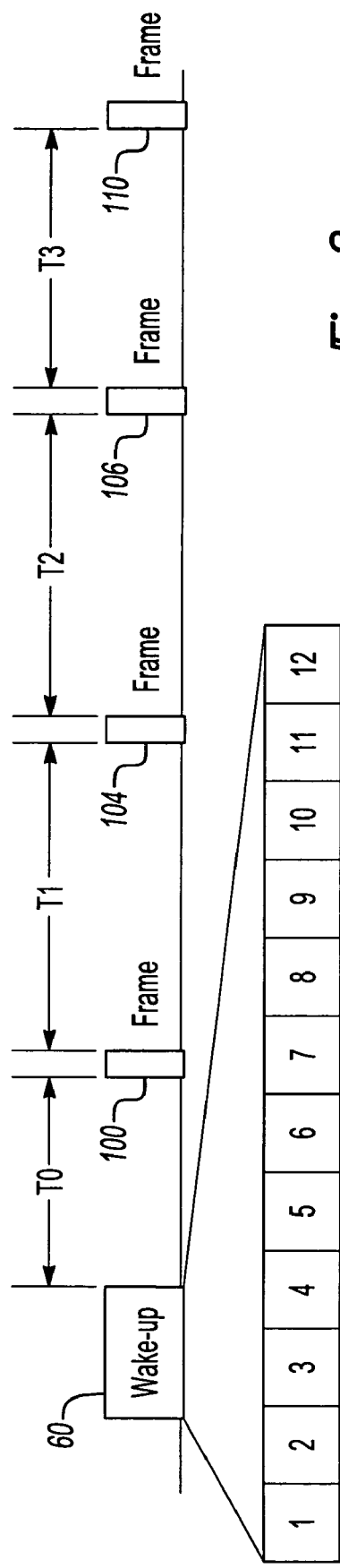
FIG. 2 illustrates a technique for switching between reception modes by using a wake-up signal.
Figure 3:
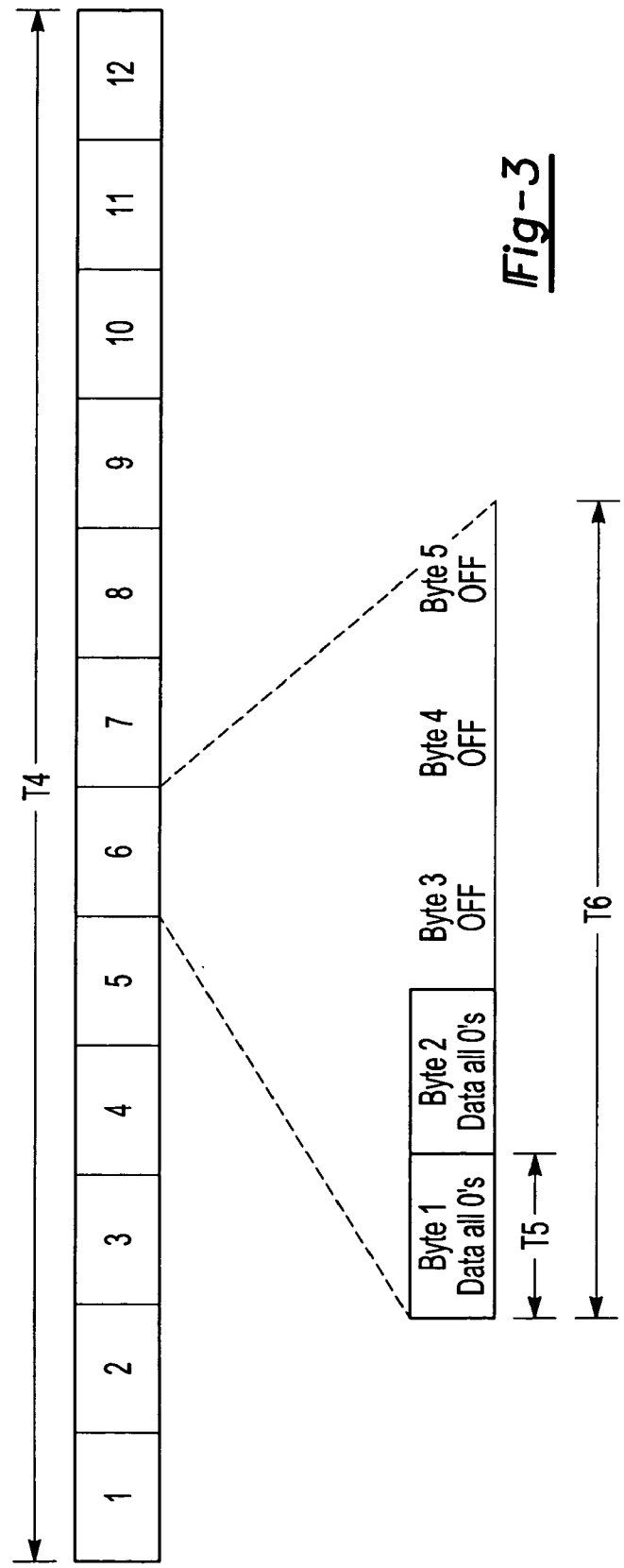
FIG. 3 illustrates the wake-up signal of FIG. 2.

FIGS. 1, 2 and 3 illustrate how control unit 58 makes the switch between first reception mode 50 and second reception mode 54. Specifically, as shown in FIG. 1, control unit 58 is in communication with receiver 46. Under the appropriate circumstances, control unit 58 switches from first reception mode 50 to second reception mode 54 by sending wake-up signal 60 to receiver 46 so that receiver 46 switches between first reception mode 50 to second reception mode 54. When wake-up signal 60 is received by receiver 46, receiver 46 switches reception modes to receive signals in second reception mode 54.

As shown in FIG. 2, these signals or data frames from tire pressure monitoring system 38, frame 100, frame 104, frame 106 and frame 110, are all transmitted by second transmitter 42 in FSK mode after wake-up signal 60 is received by receiver 46. Frames 100, 104, 106 and 110 represent data packets sent by second transmitter 42. Frames 100, 104, 106 and 110 are identical except they are transmitted at different times, say points in time, $T_0$, $T_1$, $T_2$ and $T_3$, respectively. This redundant transmission of frames 100, 104, 106 and 110 ensures that at least one of the frames will be received by receiver 46. Moreover, there is also a delay in time $T_0$, between wake-up signal 60 and the reception of first frame 100. To may be a delay of 110 milliseconds to help meet FCC transmission requirements.

As shown in FIG. 3, wake-up signal 60 is made up of a predetermined number of packets of information. A packet of information takes 4.16 milliseconds to transmit while a byte of information may take 833 microseconds. FIG. 3 illustrates that a packet of information may have only two bytes of transmitted information with the remaining three bytes containing no information. This pattern is used to comply with FCC requirements. It should be noted that wake-up signal 60 is repeated ten times to ensure the switch between modes of reception. Wake-up signal 60 may last say 50 milliseconds.

The decision to send wake-up signal 60 and thereby switch between first reception mode 50 and second reception mode 54 is made by control unit 58 based upon sensed conditions as detected by vehicle sensors: here, speed sensor 66, transmission sensor 70 and ignition sensor 74. For an automatic transmission, these sensors provide data to control unit 58 to make the switch between first reception mode 50 and second reception mode 54. The conditions for wake-up signal 60 are set forth in FIG. 4. Here, control unit 58 determines whether a key is in the ignition of the vehicle through ignition sensor 74, whether the transmission is in park (P), reverse (R), neutral (N), drive (D), or lower gear (L), through transmission sensor 70 and whether vehicle speed exceeds a certain value through speed sensor 66. Based on information from these sensors, control unit 58 determines which receiver mode is appropriate, whether first reception mode 50 or second reception mode 54.

Figures 4, 5:
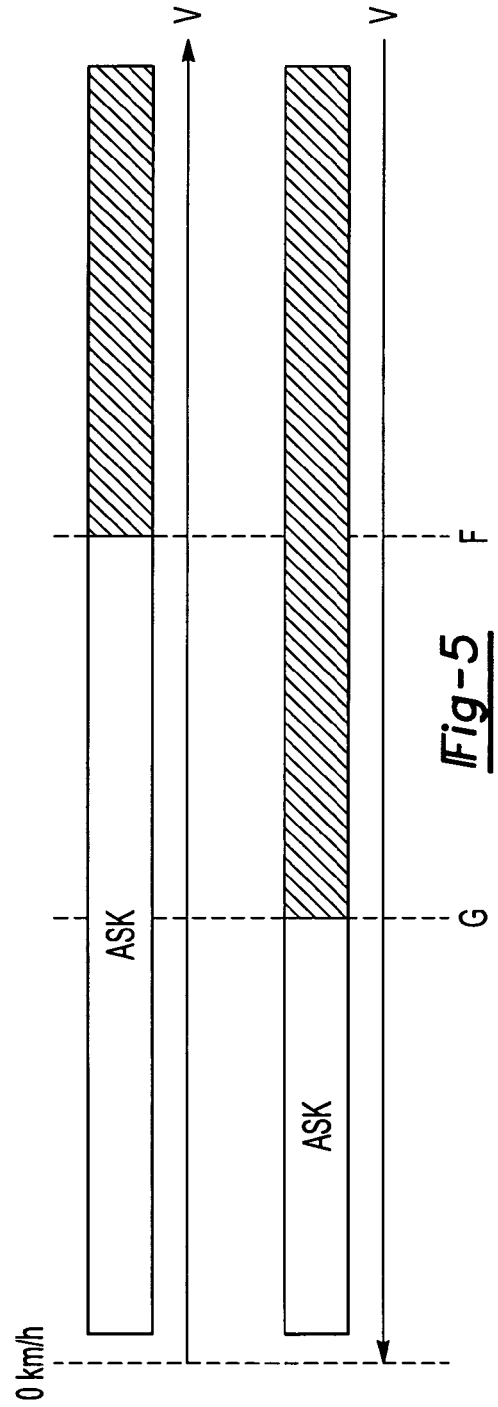
FIG. 4 illustrates a chart of sensed conditions for making a switch between reception modes.
FIG. 5 illustrates a switch between reception modes based upon a sensed condition.

For example, if transmission sensor 70 detects a vehicle transmission to be in park, then receiver 46 is left in first reception mode 50 to receive ASK signals from remote port actuation system 22. In addition, if vehicle speed is less than a predetermined value, say five miles per hour, receiver 46 is left in first reception mode 50. In both of these situations, it is presumed that receiver 46 is most likely to receive a signal from remote port actuation system 22 rather than a signal from tire pressure monitoring system 38. In addition, as shown in FIG. 4, if key is not in the ignition and the vehicle is not in park, control unit 58 sets receiver 46 in first reception mode 50. It is presumed that the vehicle is in neutral so that it is more likely that remote port actuation system 22 will be used. Accordingly, under these conditions, receiver 46 is placed in first reception mode 50.

Alternatively, if a key is detected in the ignition as detected by ignition sensor 74, and transmission sensor 70 detects a gear other than park and the speed of the vehicle is other than zero as determined by speed sensor 66, receiver 46 is switched to second reception mode 54. As explained above, wake-up signal 60 is sent from control unit 58 to receiver 46. In addition, if the vehicle is in park without a key in the ignition, and the vehicle speed is greater than five miles per hour, it is presumed that the information received by transmission sensor 70 is false and receiver 46 is placed in second reception mode 54. For these circumstances, control unit 58 gives priority to tire pressure monitoring system 38.

However, control unit 58 switches receiver 46 back to first mode 50 in the event that there is a loss of signal from speed sensor 66 or transmission sensor 70. This is so because it is preferable to prioritize the reception of signals from remote port actuation system 22 over the reception of signals from tire pressure monitoring system 38. In other words, it is more important to control actuation of the doors, window and trunk of the vehicle then to monitor the conditions of the vehicle's tires.

Typically, receiver 46 is set in first reception mode 50 as a default. There are instances where priority must be given to tire pressure monitoring system 38 immediately, such as for a sudden loss of tire pressure. In such an instance, communication system 18 has a feature for giving signals from tire pressure monitoring system 38 priority. Receiver 46 has sensor 47 to determine whether an FSK or an ASK signal is being transmitted. In the event a change in tire pressure is detected and the acceleration of wheel 14 is smaller than, say, five G's, wake-up signal 60 is transmitted by second transmitter 42 initially in ASK mode to wake-up receiver 46 and to cause receiver 46 to switch from first reception mode 50 to second reception mode 54. It should be noted that second transmitter 42 transmits wake-up signal 60 in ASK mode because receiver 46 is in first reception mode 50 by default so that only an ASK signal will awaken receiver 46. Second transmitter 42 subsequently transmits information in FSK mode following this initial wake-up signal 60.

FIG. 5 illustrates a technique for switching between reception modes based on speed alone. Such a technique may be helpful for switching between modes for a manual transmission, which does not have a transmission gear position sensor. Here, the vehicle speed is determined by speed sensor 66. In the event vehicle speed exceeds predetermined value F, control unit 58 switches receiver 46 from first reception mode 50 to second reception mode 54. However, control unit 58 does not switch back from FSK mode to ASK mode at the same value. Instead, control unit 58 switches receiver 46 from second reception mode 54 to first reception mode 50 at predetermined value G, a vehicle speed less than predetermined value F. In so doing, this technique avoids the rapid switching back and forth between reception modes that would occur if receiver 46 simply switched back and forth between modes at only one threshold, say predetermined value F. Predetermined value F may be 15 kilometers per hour while predetermined value G may be 11 kilometers per hour. To make the switch to FSK mode, a key must be detected in the ignition as well.

Figure 6:
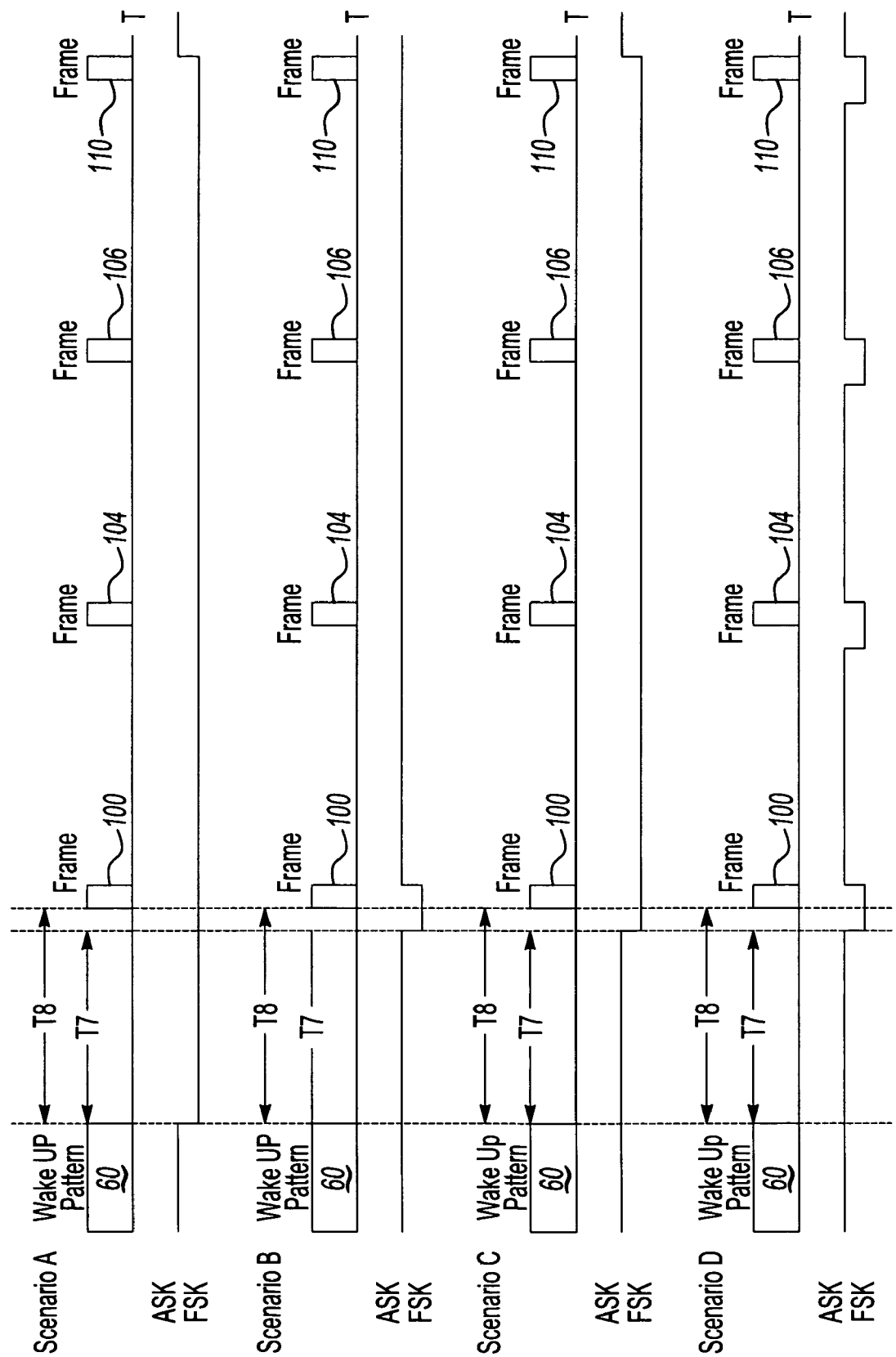
FIG. 6 illustrates various techniques for switching reception modes.

The foregoing techniques control when wake-up signal 60 is sent. FIG. 6 illustrates various strategies for switching between first reception mode 50 and second reception mode 54 once a wake-up signal 60 is received. This strategy may be implemented in conjunction with the other aforementioned techniques. According to Scenario A, wake-up signal 60 is received by receiver 46, which makes the switch immediately to FSK mode or second reception mode 54. Receiver 46 stays in second reception mode 54 for a predetermined amount of time to receive all four frames 100, 104, 106 and 110 from second transmitter 42. After this predetermined amount of time, control unit 58 switches receiver 46 back to first reception mode 50. This scenario permits all tire pressure monitoring system data frames to be received and compared with each other to determine whether they are consistent and therefore accurate. However, this scenario prevents reception of a signal from the remote vehicle portion actuation system 22 for this entire time period.

In Scenario B, control unit 58 delays the switch between first reception mode 50 to second reception mode 54 by predetermined amount of time $T_7$. $T_7$ is a time just prior to the time of transmission $T_8$ of first frame 100. Following $T_7$, control unit 58 switches receiver 46 to second reception mode 54 for a sufficient period of time to pick up first frame 100 and then switches receiver 46 back to first reception mode 50. This scenario allows receiver 46 to stay in first reception mode 50 for a longer period of time then the prior scenario. However, this scenario does not permit one frame to be checked against the others.

Scenario C delays the switch from first reception mode 50 to second reception mode 54 by the amount $T_7$ like Scenario B. However, control unit 58 then maintains receiver 46 in second reception mode 54 to receive all frames 100, 104, 106 and 110. After all of these frames have been received, then control unit 58 switches receiver 46 back to first reception mode 50. This scenario allows all of the frames 100, 104, 106 and 110 to be received and to allow their values to be compared to each other for accuracy. It further reduces the amount of time in second reception mode 54 by the amount $T_7$ compared with Scenario A. However, reception in first mode 50 is still limited for a relatively long time period.

Scenario D offers another strategy. Here, the switch between first reception mode 50 to second reception mode 54 is delayed by the amount of time $T_7$. However, unlike the previous scenarios, control unit 58 maintains receiver 46 in second reception mode 54 only for the amount of time necessary to receive each frame 100, 104, 106 or 110. This permits all data frames 100, 104, 106 and 110 to be received. It further permits each of these frames to be compared with each other for accuracy. However, the frequent switching between frames places a task burden on the microprocessor of control unit 58, which may serve other purposes. For example, because this microprocessor serves to analyze data from the tire pressure monitoring system 38, the loading of the microprocessor slows processing of information from system 38.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A communication system for a vehicle comprising:
    a first transmitter for transmitting a first signal relating to a first vehicle system;
    a second transmitter for transmitting a second signal relating to a second vehicle system that is different than the first vehicle system, said first and second signals each having a modulation that is different than the other;
    a sensor configured to send a switching signal in response to a sensed condition;
    a receiver in communication with said sensor and having a first reception mode and a second reception mode, said first reception mode receptive to said first signal and not said second signal and said second mode receptive to said second signal and not said first signal;
    a control unit for switching said receiver between said first reception mode and said second reception mode in response to said switching signal;
    wherein said control unit is programmed to switch between said first reception mode and said second reception mode based upon at least one sensed condition; and
    wherein said control unit is programmed to switch from said first reception mode to said second reception mode when said at least one sensed condition is at a first value relating to vehicle speed and is programmed to switch from said second reception mode to said first reception mode when said at least one sensed condition is at a second value relating to vehicle speed different from said first value.

2. The communication system of claim 1 wherein said first signal is transmitted by an amplitude modulation and said second signal is transmitted by a frequency modulation.

3. The communication system of claim 1 wherein said first transmitter for transmitting a first signal relating to a first vehicle system comprises a remote vehicle port actuation system.

4. The communication system of claim 1 wherein said second vehicle transmitter system comprises a tire pressure monitoring system.

5. A communication system for a vehicle comprising:
    a first transmitter for transmitting a first signal relating to a first vehicle system;
    a second transmitter for transmitting a second signal relating to a second vehicle system, said first and second signals each having a modulation that is different than the other;
    a sensor configured to send a switching signal in response to a sensed condition;
    a receiver in communication with said sensor and having a first reception mode and a second reception mode, said first reception mode receptive to said first signal and not said second signal and said second mode receptive to said second signal and not said first signal; and a control unit for switching said receiver between said first reception mode and said second reception mode in response to said switching signal, wherein said control unit is programmed to detect a first condition relating to a presence of a key in a vehicle ignition and a second condition relating to a gear position of a vehicle transmission, said control unit switching between said first reception mode and said second reception mode based upon said first condition and said second condition.

6. A communication system for a vehicle comprising:

a first transmitter for transmitting a ASK signal relating to a remote vehicle port actuation system;

a second transmitter for transmitting a FSK signal relating to a tire pressure monitoring system;

a receiver having a first reception mode and a second reception mode, said first reception mode receptive to said ASK signal and said second mode receptive to said FSK signal;

a control unit programmed to switch said receiver between said first reception mode and said second reception mode based upon a sensed condition; and wherein said control unit is programmed to switch between said ASK mode and said FSK mode based upon said sensed condition, which includes vehicle speed, said ASK mode being a default mode, said control unit switching said receiver to FSK mode in response to a predetermined vehicle speed.

7. The communication system of claim 6 wherein said ASK signal is transmitted by an amplitude modulation and said FSK signal is transmitted by a frequency modulation, said first and second modes respectively corresponding to said ASK and said FSK modes.

8. The communication system of claim 6 wherein said at least one sensed condition relates to a presence of a key in a vehicle ignition, said control unit programmed to switch said receiver from said ASK mode to said FSK mode in response to said presence of the key in the vehicle ignition.

9. The communication system of claim 6 wherein said at least one sensed condition relates to a gear position of a vehicle transmission, said gear position including park and non-park conditions, said control unit programmed to switch said receiver from said FSK mode to said ASK mode in response to said park condition and from said FSK mode to said ASK mode in response to said non-park condition.

10. The communication system of claim 6 wherein said at least one sensed condition relates to a presence of a key in a vehicle ignition and a gear position of a vehicle transmission.

11. The communication system of claim 6 wherein said control unit is programmed to switch said receiver from said FSK mode to said ASK mode when said vehicle speed is lower than said predetermined vehicle speed.

12. The communication system of claim 6 wherein said control unit is programmed to detect a first set of conditions and a second set of conditions different from said first set of conditions, said control unit placing said receiver in said first reception mode when said first set of conditions exist and placing said receiver in said second reception mode when said second set of conditions exist.

* * * * *